US012080025B2

United States Patent
Garud et al.

(10) Patent No.: US 12,080,025 B2
(45) Date of Patent: Sep. 3, 2024

(54) CAMERA-ONLY-LOCALIZATION IN SPARSE 3D MAPPED ENVIRONMENTS

(71) Applicant: TEXAS INSTRUMENTS INCORPORATED, Dallas, TX (US)

(72) Inventors: Hrushikesh Tukaram Garud, Parbhani (IN); Deepak Poddar, Bengaluru (IN); Soyeb Noormohammed Nagori, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/887,580

(22) Filed: Aug. 15, 2022

(65) Prior Publication Data

US 2022/0392108 A1 Dec. 8, 2022

Related U.S. Application Data

(63) Continuation of application No. 16/854,590, filed on Apr. 21, 2020, now Pat. No. 11,417,017.

(51) Int. Cl.
*G06T 7/00* (2017.01)
*G01C 21/30* (2006.01)
(Continued)

(52) U.S. Cl.
CPC .............. *G06T 7/73* (2017.01); *G01C 21/30* (2013.01); *G06T 7/75* (2017.01); *G06V 10/993* (2022.01);
(Continued)

(58) Field of Classification Search
CPC ... G06T 7/73; G06T 7/75; G06T 2207/30252; B60R 1/00; B60R 2300/302;
(Continued)

(56) References Cited

U.S. PATENT DOCUMENTS 10,395,117 B1 * 8/2019 Zhang .................. G01C 21/206
2017/0357858 A1 * 12/2017 Mendonca ............. G06V 20/56
(Continued)

OTHER PUBLICATIONS

Feature (computer vision); https://en.wikipedia.org/wiki/Feature_(computer_vision); WikipidiA; Dec. 1, 2021; 9 pages.

*Primary Examiner* — Ping Y Hsieh
*Assistant Examiner* — Xiao Liu
(74) *Attorney, Agent, or Firm* — Brian D. Graham; Frank D. Cimino; Xianghui Huang

(57) ABSTRACT

Techniques for localizing a vehicle include obtaining an image from a camera, identifying a set of image feature points in the image, obtaining an approximate location of the vehicle, determining a set of sub-volumes (SVs) of a map to access based on the approximate location, obtaining map feature points and associated map feature descriptors associated with the set of SVs, determining a set of candidate matches between the set of image feature points and the obtained map feature points, determining a set of potential poses of the camera from candidate matches from the set of candidate matches and an associated reprojection error estimated for remaining points to select a first pose of the set of potential poses having a lowest associated reprojection error, determining the first pose is within a threshold value of an expected vehicle location, and outputting a vehicle location based on the first pose.

19 Claims, 6 Drawing Sheets

(51) Int. Cl.
  *G06T 7/73* (2017.01)
  *G06V 10/98* (2022.01)
  *G06V 20/56* (2022.01)
  *G06V 20/64* (2022.01)

(52) U.S. Cl.
  CPC ............ *G06V 20/56* (2022.01); *G06V 20/647* (2022.01); *B60R 2300/302* (2013.01); *G06T 2207/30252* (2013.01)

(58) Field of Classification Search
  CPC ...... G01C 21/30; G06V 10/993; G06V 20/56; G06V 20/647
  See application file for complete search history.

(56) References Cited

U.S. PATENT DOCUMENTS

| | | |
|---|---|---|
| 2018/0005015 A1 | 1/2018 | Hou et al. |
| 2018/0033160 A1 | 2/2018 | Ishigami |
| 2018/0189576 A1 | 7/2018 | Joshi et al. |

\* cited by examiner

FIG. 5A

| MAP HEADER | 502 |
|---|---|
| SV 0 | |
| SV 1 | |
| ○○○ | KEYPOINTS LISTS |
| SV N | |

| x_min | x_max | y_min | y_max | z_min | sv_dim |
|---|---|---|---|---|---|
| N | Nx | Ny | Nz | NUMBER OF DESCRIPTORS AVAILABLE | LOCATION OF THE KEYPOINTS LISTS |
| SV 0 START POSITION | SV 0 NUMBER OF POINTS | SV 1 START POSITION | SV 1 NUMBER OF POINTS | SV K NUMBER OF POINTS | SV N NUMBER OF POINTS |
| SPACE RESERVED FOR INFORMATION OF THE KEY-POINT DESCRIPTORS AVAILABLE | | | ○○○ | | SV N START POSITION |

FIG. 5C

| | LOCATION | | | DESCRIPTION | | | | ADDITIONAL INFORMATION |
|---|---|---|---|---|---|---|---|---|
| | x | y | z | E0 | E1 | ○○○ | E63 | |
| KEY-POINT | | | | | | | | OPTIONAL |

550

CAMERA-ONLY-LOCALIZATION IN SPARSE 3D MAPPED ENVIRONMENTS

CROSS-REFERENCE TO RELATED APPLICATIONS

This application is a continuation of U.S. patent application Ser. No. 16/854,590, filed Apr. 21, 2020, which claims priority to India Provisional Application No. 201941015827, filed Apr. 22, 2019, each of which is hereby incorporated by reference.

BACKGROUND

Increasingly, vehicles, such as cars, airplanes, robots, etc., are being equipped with multiple external cameras to provide to the operator of the vehicle external views of the area surrounding the vehicle. These external views are commonly used to help maneuver the vehicle, such as when backing up or parking a car. Additionally, vehicles are increasingly being equipped for semi-autonomous operations in certain scenarios and environments. Once such scenario is the automated valet parking scenario where a vehicle is able to navigate to and park itself in a parking spot and return to the operator when called for. Often, parking scenarios occur in areas in which global positioning system (GPS) information may be difficult to obtain, such as in parking garages, between tall buildings, etc. Thus, there is a need for an accurate, real-time, camera-based mapping and localization scheme for autonomous vehicle operation.

SUMMARY

This disclosure relates to a technique, including obtaining an image from a camera of a vehicle, identifying a set of image feature points in the image, obtaining an approximate location of the vehicle, determining a set of sub-volumes (SVs) of a map to access based on the approximate location of the vehicle, obtaining map feature points and associated map feature descriptors of the set of SVs, determining a set of candidate matches between the set of image feature points and the obtained map feature points, determining a set of potential poses of the camera from candidate matches from the set of candidate matches and an associated reprojection error estimated for remaining points to select a first pose of the set of potential poses based on having a lowest associated reprojection error, determining the first pose is within a threshold value of an expected vehicle location, and outputting a vehicle location based on the first pose.

Another aspect of the present disclosure relates to a device including a camera, a memory, one or more processors operatively coupled to the memory, and the camera, wherein the one or more processors are configured to execute non-transitory instructions causing the one or more processors to obtain an image from the camera, identify a set of image feature points in the image, obtain an approximate location of the vehicle, determine a set of SVs of a map to access based on the approximate location of the vehicle, obtain map feature points and associated map feature descriptors of the set of SVs, determine a set of candidate matches between the set of image feature points and the obtained map feature points, determine a set of potential poses of the camera from candidate matches from the set of candidate matches and an associated reprojection error estimated for remaining points to select a first pose of the set of potential poses based on having a lowest associated reprojection error, determine the first pose is within a threshold value of an expected vehicle location, and output a vehicle location based on the first pose.

Another aspect of the present disclosure relates to a non-transitory program storage device comprising instructions stored thereon to cause one or more processors to obtain an image from a camera, identify a set of image feature points in the image, determine, for each image feature point in the image, an image feature descriptor associated with the respective image feature point, obtain distance information for each image feature point, obtain a location of the vehicle, determine a set of map feature points of a map based on the location of the vehicle, the image feature points, and the obtained distance information for the image feature points, and write image feature points and associated image feature descriptors to the determined set of map feature points of the map.

BRIEF DESCRIPTION OF THE DRAWINGS

For a detailed description of various examples, reference will now be made to the accompanying drawings in which:

FIG. 5A illustrates an example data structure for a voxel-based map, in accordance with aspects of the present disclosure.

FIG. 5B illustrates an example map header, in accordance with aspects of the present disclosure.

FIG. 5C illustrates an example keypoint entry, in accordance with aspects of the present disclosure.

DETAILED DESCRIPTION

Figure 1:
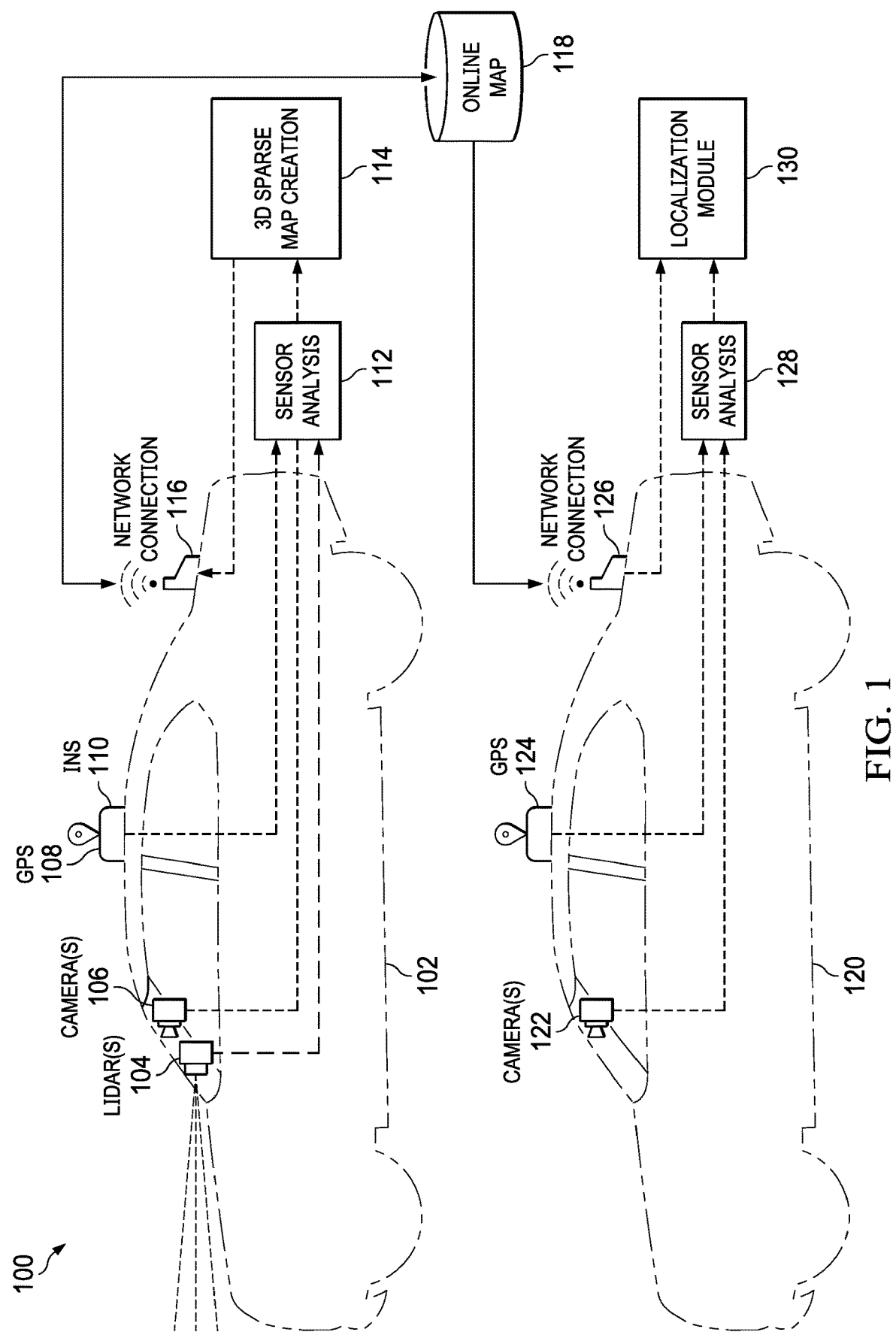
FIG. 1 illustrates example sensor configurations, in accordance with aspects of the present disclosure.

Automated parking may be considered a part of automated driving applications and can be described in terms of a set of high-level tasks. These tasks include perception, localization, mapping, and planning and control. Perception addresses taking in information about the world to detect and track other traffic participants, signs, obstacles, drivable areas, etc. Localization addresses determining vehicle location in 3D space relative to the world. Mapping is closely related to localization and works with localization to map the world in real time, for example to augment a static map with dynamic information obtained from the perception task. Planning and control addresses path planning at various levels, including route planning, path planning, maneuver planning, trajectory planning, and vehicle control. Route planning refers to determining a start and end location, path panning refers to determining how to get from the start and end locations, maneuver planning refers to setting up specific maneuvers, such as lane positions and turns, trajectory planning refers to determining how to execute a particular maneuver, such as performing a wider or narrower turn, speed of a turn, etc., and vehicle control navigates and controls the vehicle on the planned path. Accurate positional information of the vehicle helps with performing these mapping and planning/control tasks. While positional information can often be obtained using dedicated sensors, such as GPS and internal navigational systems (INS), these systems cannot be the sole source of positional information for automated vehicle operations as tasks, such as automated parking, often occur in areas with little or no GPS signal reception and over periods of time in which INS systems may experience enough drift to not be able to provide accuracy in the rage of tens of centimeters often needed for parking. Therefore, there is a need for accurate, real-time ego localization for GPS denied environments using commodity hardware.

In accordance with aspects of the present disclosure, a camera-based localization scheme utilizing a map containing information related to areas of automated operations may be used. These areas of automated operation may include areas such as road networks, parking lots, locations of parking spots, charging stations, etc. In certain cases, the map may include sparse/dense environment data (e.g., features) that may be used in conjunction with images captured with an on-vehicle camera to estimate the vehicle's location (e.g., ego location). Ego location may be performed, for example, by matching the features detected in the images from the on-vehicle camera against map features. It may be understood that on-vehicle cameras may include any imaging devices capable of capturing visible and non-visible wavelengths of light, such as visible light cameras and infrared cameras, either as still images or as video. Maps are created using a teach and repeat scheme with mapping vehicles surveying areas of automated operation by driving along the areas to collect information about these areas. This collected data is used to build the maps with specified characteristics which are later detected and used for localization by the automated vehicles to estimate a pose of the vehicle, that is, a position and orientation of the vehicle relative to the map space. The pose of the vehicle may have six variables, three points for XYZ location in 3D space, and an orientation for each of the three axes.

FIG. 1 illustrates example sensor configurations 100, in accordance with aspects of the present disclosure. As shown, mapping vehicle 102 has an example sensor configuration including lidar sensor 104, camera(s) 106, GPS receiver 108, and an INS sensor 110. The GPS receiver 108 helps the mapping vehicle 102 estimate its location, while the INS sensor 110 may be used to help augment the location information from the GPS receiver 108. The sensors may be rigidly mounted such that a pre-mapping calibration process of the rigidly mounted sensors provides intrinsic and extrinsic parameters (e.g., describing a 3D relationship of the sensors) that can be used for the fusion of lidar 104, camera(s) 106, GPS 108, and INS 110 sensor data, for example at a sensor analysis unit 112, to create the map. During map creation, landmarks may be detected in the images captured by the camera(s) 106 on the mapping vehicle 102. Landmarks are the points of interest which can be detected and described based on their visual properties. A 3D position of the landmarks in the coordinate system of the cameras may then be determined using the lidar sensor 104. An estimation of a global location of the mapping vehicle 102 may be provided based on the GPS 108 and INS 110 sensors and pose information provided by the lidar 104, camera(s) 106, and intrinsic and extrinsic parameters. In certain cases, other sensor(s) and/or algorithms capable of determining distances for a particular point may be used. For example, multiple cameras may be used to obtain landmark positioning information in place of the lidar 104, or multiple view geometry algorithms may be used instead of the lidar 104. The landmark points may be output from the sensor analysis unit 112 and accumulated into the map 114. Each landmark point is represented by a 3D location, relative to a position of the vehicle, along with an associated description from the image. In certain cases, the landmarks may be detected, for example, using image and/or feature recognition algorithms to generate a feature descriptor, such as a feature vector, describing the landmark represented by the landmark point. As the map is made up of a set of 3D points, the map may be referred to as 3D sparse map. Map data may then be uploaded via a network connection 116 to an online map 118.

A navigating vehicle 120 has an example sensor configuration including camera(s) 122 and a GPS receiver 124. The camera(s) 122 may be rigidly mounted to the navigating vehicle 120 and calibrated to provide intrinsic and extrinsic parameters to describe the relative 3D relationship between the camera and the navigating vehicle 120. In certain cases, the camera(s) 122 may not necessarily be forward facing, so long as the camera(s) have a view of landmarks around the vehicle. The 3D indicates the position and orientation relationship between the camera and the navigating vehicle 120. The navigating vehicle 120 can obtain map data from the online map 118 based on location information from the GPS receiver 124 via network connection 126. To help in areas where GPS reception may be problematic, the obtained map data may be for an area around the location from the GPS indicated location. For example, the area of the obtained map data may be fixed or variable, such as based on the expected error from the GPS indicated location. Landmarks may be detected in the images captured by the camera(s) 122 on the navigating vehicle 120 using, for example, feature detection/recognition algorithms in the sensor analysis unit 128. These detected feature points may be compared to the obtained 3D sparse map feature points to determine a location of the navigating vehicle 120 in a localization module 130, for example, by using 2D-3D correspondence matching and using a perspective-n-point algorithm.

Figure 2:
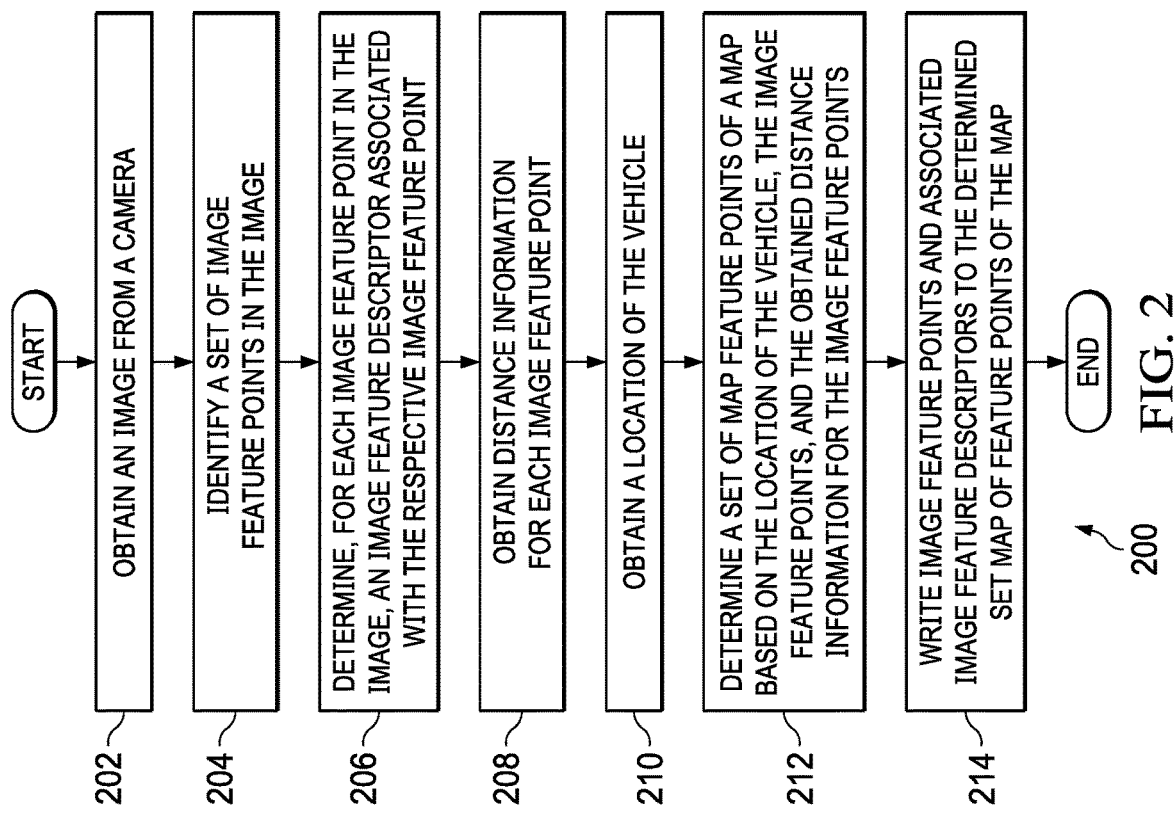
FIG. 2 is a flow chart illustrating a technique for generating a map, in accordance with aspects of the present disclosure.

FIG. 2 is a flow chart illustrating a technique for generating a map 200, in accordance with aspects of the present disclosure. At block 202 an image from a camera is obtained. At block 204, a set of image feature points may be identified in the image. Feature points of an image generally refer to structures within an image that an image keypoint detection and description algorithm looks for and these structures may vary based on the specific algorithm or application of the algorithm. For purposes of this discussion, keypoints and feature points may be understood to be substantially synonymous. At block 206, an image feature descriptor is determined for each feature point in the image. Generally, the image feature descriptor describes a detected image feature point and this image feature descriptor may vary based on the specific algorithm or application of the algorithm. In certain cases, the image feature descriptor may be represented by a vector of numbers, such as floating-point or integer numbers. In some examples, a feature descriptor represents a relationship between properties (e.g., chroma values, luma values, and/or other suitable values) of the corresponding feature point and those properties of regions defined around the feature point. In an example, a feature descriptor includes a set of values that represent derivatives of grayscale or luma intensities across a number of regions around the feature point. In another example, a feature descriptor includes a set of values that indicate whether the intensity (e.g., chroma, luma, and/or grayscale intensity) of the corresponding feature point is greater than or less than intensities of neighboring points. In these examples and others, image keypoint detection and description algorithms, such as Kaze, may be used to generate scale and rotation invariant feature points and descriptors of the respective feature point. At block 208, distance information for each image feature point is obtained. For example, distance information may be obtained from a distance ranging device, such as a lidar, time of flight sensor, or multiple view geometry algorithms, etc. A 3D relationship between the distance ranging device and the camera may be known and used to correlate feature points and, for example, point cloud information from a lidar device. At block 210, a location of the vehicle is obtained. For example, the location of the vehicle may be obtained using a GPS or INS device. At block 212, a set of map feature points of a map may be determined based on the location of the vehicle, the image feature points, and the obtained distance information for the image feature points. For example, a map may include a set of feature points, the feature points representing landmark points present in the volume of an area included in the map. The map be divided into a set of sub-volumes (SVs) where each SV includes a list of map feature points that are within the volume represented by the SV. At block 214, image feature points and associated image feature descriptors to the determined set of feature points may be written to the map. For example, for locations that have not been previously mapped, the image feature points and associated image feature descriptors may be saved in a non-transitory storage medium. As another example, for locations that have been previously mapped, the image feature points and associated image feature descriptors may be saved either over existing data in the map, or in addition to existing data in the map.

Figure 3:
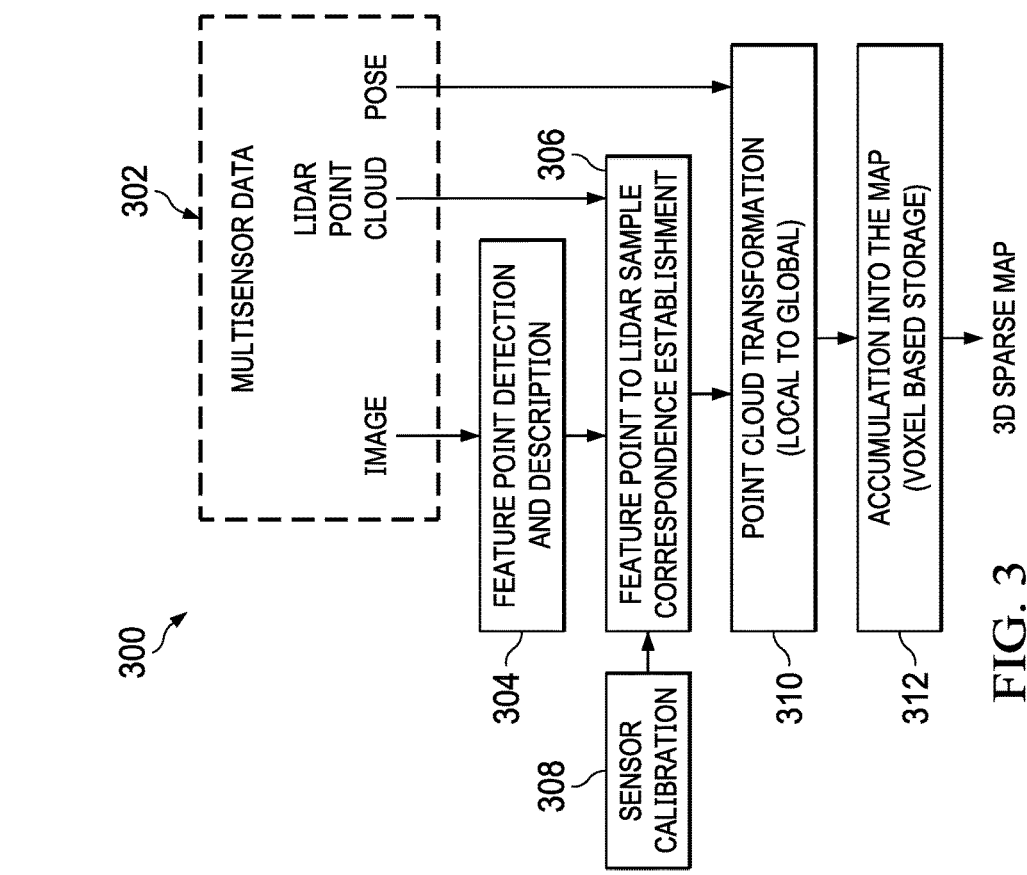
FIG. 3 is a flow chart illustrating a technique for generating mapping data, in accordance with aspects of the present disclosure.

FIG. 3 illustrates steps for generating mapping data 300, in accordance with aspects of the present disclosure. At block 302, data is received from multiple sensor sources. For example, images are received from one or more cameras, on the mapping vehicle, point cloud information may be received from the lidar sensor, and pose information may be received from a GPS/INS system. At block 304, feature point detection and description may be performed on images captured from the cameras. Feature point detection and description may be performed by a variety of feature detection algorithms, such as speeded up robust features (SURF), scale-invariant feature transform (SIFT), vantage point (VP) tree, oriented FAST (features from accelerated segment test), rotated BRIEF (binary robust independent elementary features), Kaze, etc. As an example, with Kaze, feature descriptors are computed on non-linear scale space representation of reduced resolution camera images. Kaze features are computed on 2D image by describing landmark points by summary of the high frequency information present in image neighborhoods. The process of nonlinear scale spaces and actual feature computation in the scale of detected landmark point helps allow for scale and rotation invariance, which helps avoid ambiguities when matching features. Features values in Kaze are real numbers generally in a range [0, 1], which may be represented as floating point numbers. The floating point representation helps allow for higher precision, despite the potentially higher computational expense and corresponding potentially higher execution time and more complex hardware. To help increase performance, 16-bit signed fixed point representation using a Q14 format may be used to represent feature values. Q representation of floating point values may be stored and operated on as if they are binary signed integers, helping enhance performance and storage sizes.

Figure 4:
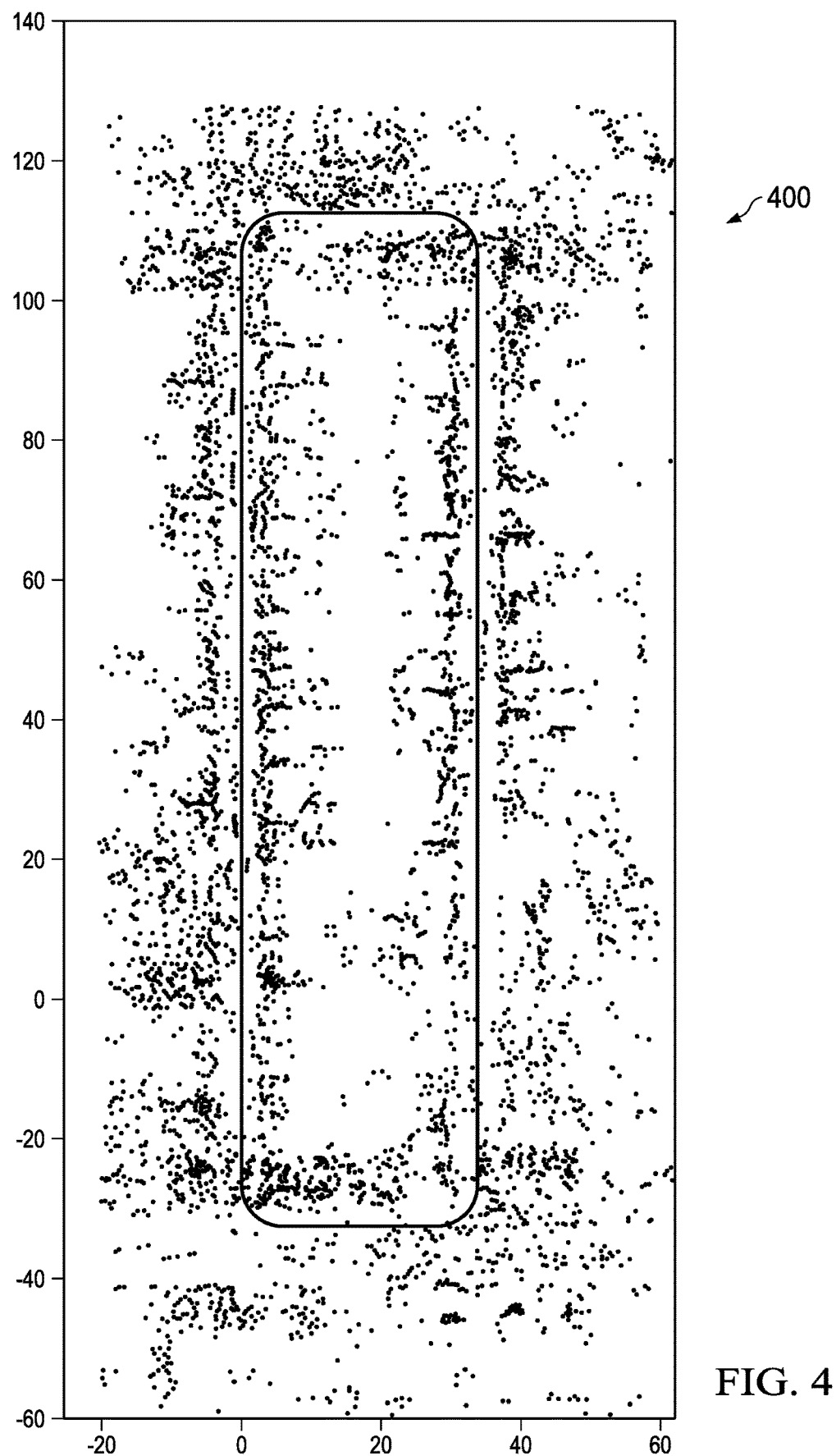
FIG. 4 illustrates a 2D graphical view of a set feature points, as viewed from above arranged based on the location information associated with the feature points.

At block 306, a correspondence is established between the detected feature points and lidar samples from the lidar point cloud. In accordance with aspects of the present disclosure, the sensors may be calibrated to provide intrinsic and extrinsic parameters to describe the relative 3D relationship as between the sensors, and as between the sensors and the mapping vehicle. This calibration information 308 may be predetermined, for example, during a calibration phase prior to mapping, and used to help determine which lidar points correspond to a detected feature point. This correspondence helps determine a relative location of the feature point is to the camera(s) and mapping vehicle. At block 310, pose information, for example position and orientation, from the GPS and/or INS sensors, is used to transform the relative location of the feature point with respect to the mapping vehicle, to a global location. FIG. 4 illustrates a 2D graphical view of a set feature points 400, as viewed from above arranged based on the location information associated with the feature points. At block 312, information regarding the feature point is accumulated into the map. For example, the information may be saved along with the other map information and uploaded to a network accessible storage location via a network connection. This network connection may be any kind of wired or wireless network connection, such as cellular, wireless fidelity (Wi-Fi), ethernet, etc. In certain cases, the map information may be stored using a voxel-based storage technique.

FIG. 5A illustrates an example data structure for a voxel-based map 500, in accordance with aspects of the present disclosure. The voxel-based storage technique effectively divides up an area being mapped into 3D sub-volume (SV) units called voxels, in a similar way that a screen is divided into pixels. Each voxel thus represents a volume of space of the environment. Feature points may be mapped to voxels of the space and all feature points which fall in a voxel form a cluster and are stored as a list of points (e.g., as a keypoint list). To aid efficient searching and random access to the voxels for matching 3D points, the area being mapped may be split into non-overlapping SVs, here SV 0-SV N. The feature point lists for the SVs may be stored in the form of a contiguous list to help reduce a size of the map in storage. Individual SV feature point lists may be located, for example during localization, using information stored in a map header 502. The map header 502 indexes the set of SVs in the map. In certain cases, the map header and the feature-points data may be stored separately and possibly even in different memories. For example, the header, or portions of the header may be stored in a particular memory different than the feature points data based on the access frequency of the header, or portions of the header. As another example, the header may be stored on a particular device while feature point data may be stored on a network server or other remote device. In certain cases, the portions of the feature point data may also be stored separately or in multiple memories.

FIG. 5B illustrates an example map header 520, in accordance with aspects of the present disclosure. In the map header 520, the x_min, x_max, y_min, y_max, z_min, z_max fields define an extent of the area in the map in three dimensions, x, y, and z. The sv_dim value indicated a size for the cubic SVs. Of note, while described as cubic, SVs may also be formed as any cuboid forming a convex polyhedron with six sides. A total number of SVs in the map may be stored in the N field, with Nx, Ny, and Nz representing a number of SVs in the respective dimension. A size of an individual voxel K is given by the SV K number of points field. A number of descriptors field indicates if more than a single descriptor is available for each feature point, and a location of keypoints lists indicates a start position for the SVs collectively. Start positions for keypoints of each SV can be found in the SV 0 start position-SV N start position fields and a number of keypoints for a given SV can be found in the SV 0 number of points-SV N number of points fields. As shown, the header also includes a reserved space, which is reserved for future use. This reserve space may include information required to detect 2D image points and describe them to match against the 3D point description. For example, if the map contains the binary census descriptors for the 3D points encoding the relative distribution of grayscale values in the image neighborhood, then the neighborhood size to be used in creation of the 2D image point description can be stored. As another example, if most of the 3D points in the map correspond to the image key-points detectable by Harris corner detector then such information may also be included. This reserved space may also contain information on storage order of the feature descriptors when more than one descriptor is available for the feature points.

Given the map header 520, a cubical sub-volume (SVx, SVy, SVz) in which a point (x,y,z) in the mapped space falls can be obtained by solving SVx=floor(x-x_min/sv_dim), SVy=floor(y-y_min/sv_dim), and SVz=floor(x-z_min/sv_dim). In a contiguously stored feature-points data a starting point for a SV can be obtained from 'P'th SV start position entry SV_SPt_P where P=SVz*(Nx*Ny)+SVy*(Nx)+SVx.

FIG. 5C illustrates an example keypoint entry 550, in accordance with aspects of the present disclosure. The keypoint entry 550 includes a 3D location of the keypoint as described by the x, y, and z fields as well as a 64-element description field for the feature descriptor. It may be understood that a length of the description field may be any size, based on the expected size of the feature descriptor.

Figure 6:
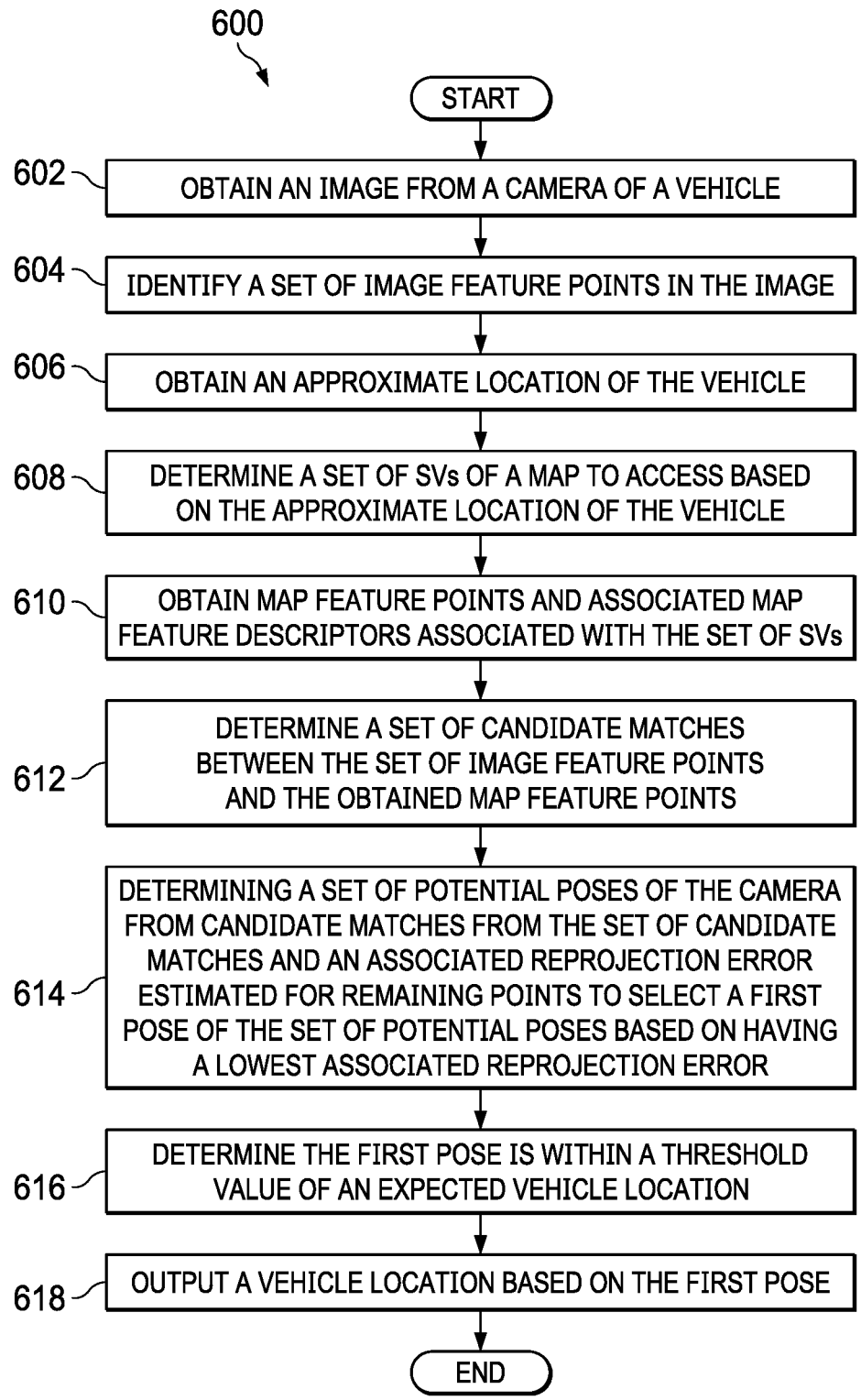
FIG. 6 is a flow chart illustrating a technique for determining a location of vehicle, in accordance with aspects of the present disclosure.

FIG. 6 is a flowchart illustrating a technique for determining a location of vehicle, in accordance with aspects of the present disclosure. At block 602, an image is obtained from a camera of a vehicle. At block 604, a set of image feature points may be identified in the image. For example, feature point detection and description algorithms, such as Kaze may be used to detect a set of feature points in the image. The feature point detection and description algorithm may describe the feature points detected by generating scale, rotation and brightness invariant feature descriptors for the feature points. In certain cases, these feature descriptors may be a vector of numbers, such as floating-point numbers. At block 606, an approximate location of the vehicle may be obtained. For example, the approximate location may be based on GPS location and/or a previously determined location of the vehicle. At block 608 a set of SVs of a map to access may be determined based on the approximate location of the vehicle. For example, a map may include a set of SVs, the SVs representing a volume of an area included in the map and each SV including a listing of map feature points that are within the volume represented by the SV. At block 610, map feature points and associated map feature descriptors of the set of SVs may be obtained. For example, feature points and associated map feature descriptors may be obtained from one or more remote servers via a network connection. In certain cases, the feature points and associated map feature may also be locally stored.

At block 612, a set of candidate matches between the set of image feature points and the obtained map feature points are determined. For example, the matching may be performed using a cost function in conjunction with 2-way correspondence to determine a set of candidate matching feature points. In certain cases, candidate matches may be determined by matching an image feature descriptor of an image feature point against the obtained map feature descriptors to determine a 2D-3D matched feature point pair, matching a map feature descriptor of the candidate matched feature point against the image feature descriptors of the set of image feature points to determine a 3D-2D matched feature point pair, and determining a candidate match based on quality of the match and comparison between the 2D-3D matched feature point pairs and the 3D-2D matched feature point pairs. The quality of the match may refer to how well the image feature points and the obtained map feature points match. For example, where a cost function is used such as SAD, the output of the cost function reflects the quality of the match. At block 614, a pose of the camera may be determined from a set of potential poses of the camera from candidate matches from the set of candidate matches and an associated reprojection error estimated for the remaining points to select a first pose of the set of potential poses based on having a lowest associated error. For example, a random sample consensus (RANSAC) algorithm may be applied. In certain cases, repeatedly estimating the pose may include randomly selecting a subset of point pairs from the set of candidate matches, determining a camera pose based on the selected feature points, generating a 2D projection of the remaining matched map feature points based on the determined camera pose, determine the Euclidean distance i.e. reprojection error value associated with the generated 2D projections and matching image feature point locations to, repeating the steps of randomly selecting feature points, determining a camera pose, generating a 2D projection, and matching map feature points to generate a set of error values, and selecting the camera pose associated with the lowest error value.

At block 616, a determination is made that the first pose is within a threshold value of an expected vehicle location. For example, the expected vehicle location may be determined based on past known or estimated position, a velocity of the vehicle and a maximum permissible motion of the vehicle for a time period. In certain cases, the velocity of the vehicle is determined based on a set of previous locations/pose estimates of the vehicle and associated times and a Kalman filter may be applied to determine a future expected vehicle location for another time period. In certain cases, the time period may be based on a predefined time period and/or a rate at which locations are determined. At block 618, a vehicle location is output based on the first pose.

Figure 7:
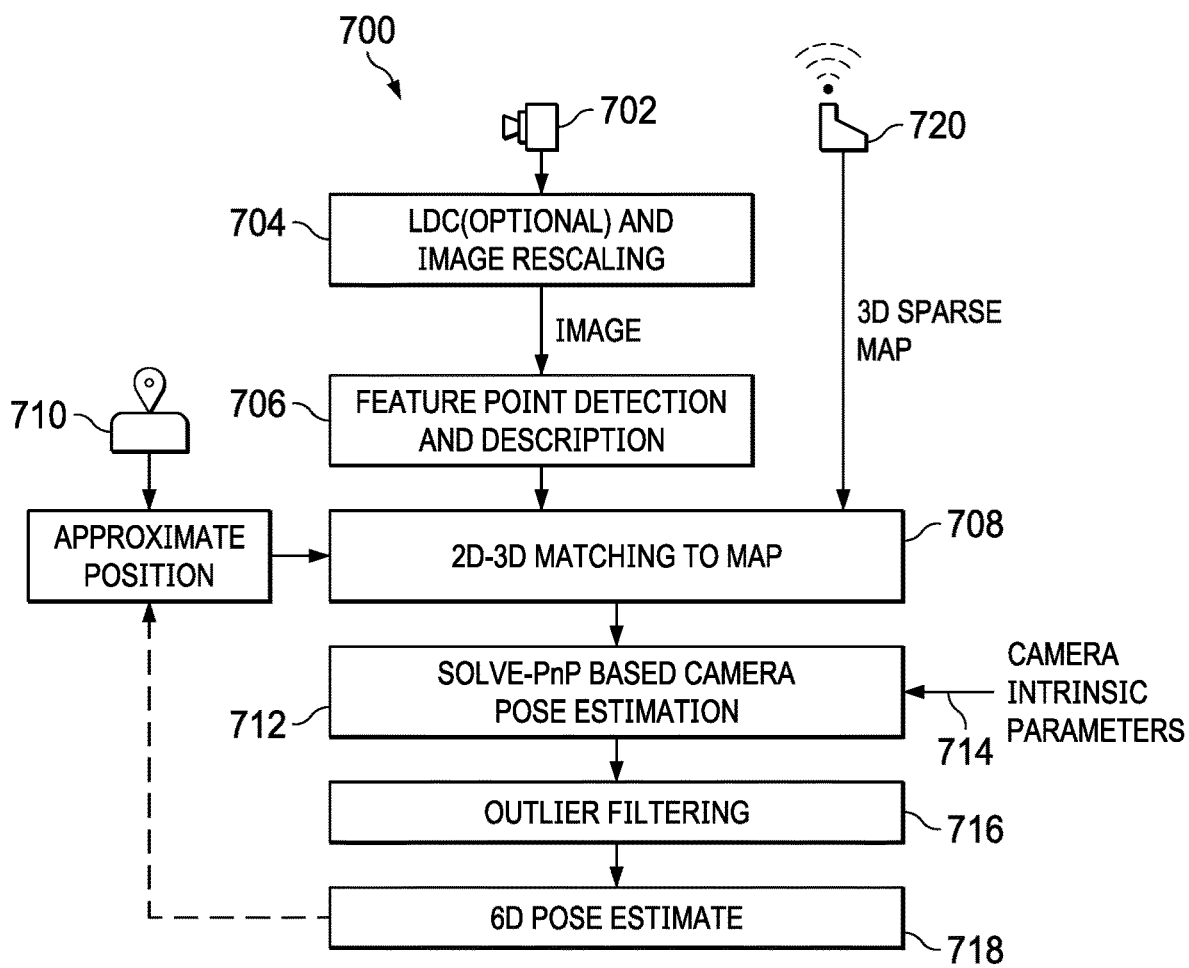
FIG. 7 is a flow chart overview of a technique for localization, in accordance with aspects of the present disclosure.

FIG. 7 is a flowchart overview of a technique for localization 700, in accordance with aspects of the present disclosure. A vehicle may perform the localization technique when trying to locate itself in a mapped environment. In certain cases, images captured by one or more cameras 702 may be optionally processed to remove lens distortion and to rescale the image at block 704. This processing may be done, for example, at the camera or as a precursor step for localization. The image captured by the one or more cameras 702 may be processed to detect feature points and feature point descriptors at block 706. Feature point detection and description may be performed by a variety of feature detection algorithms, such as SURF, SIFT, VP tree, oriented FAST, rotated BRIEF, Kaze, etc. The algorithm for feature point detection used as between the mapping vehicle and the navigating vehicle should be complementary such that the feature points detected and descriptors generated by the algorithms should be matchable. For example, if the feature points and descriptors in the map were generated using Kaze, the algorithm user for feature point detection for localization should either be Kaze or an algorithm capable of generating feature points and descriptors substantially similar to those generated by Kaze.

Once the feature points and descriptors are generated for the 2D image, the feature points and descriptors may be matched to the 3D sparse map at block 708. Matching feature points and descriptors generated from captured images to those of the 3D map in real-time may be performed by various algorithms such as binary Hamming distance for matching binary feature descriptors or cross-correlation for multivalued feature descriptors. In this example, the sum of absolute differences (SAD) algorithm may be used as a cost function for matching. As described above, feature descriptors may comprise a set of values. For example, using Kaze and 16-bit fixed point representation produces 64 values, 16 bit in length. For two feature descriptors being compared, an absolute difference between corresponding sets of values may be determined and these absolute differences are then summed together to generate a value. The feature descriptors from the capture 2D image may be compared to multiple feature descriptors in the 3D map to determine the candidate match (e.g., for SAD, the lowest absolute difference value). In certain cases, the feature descriptors from the captured image may be compared to every feature descriptor in the map. In other cases, an approximate position of the vehicle may be obtained, for example based on GPS 710 information or a previously determined location, and this approximate position may be used to narrow down the set of feature descriptors to be compared to those in a volume of space near the approximate position of the vehicle. In certain cases, portions of the 3D sparse map may be obtained, for example, via a network connection 720. Portions of the 3D sparse map may be obtained based on an approximate location of the vehicle. For example, based on the approximate location, a set of relevant SVs of a 3D voxel based map may be determined and accessed via a map header. In certain cases, the portion of the 3D sparse map to be obtained may further be reduced by taking into account an expected direction of the camera.

In certain cases, SAD results alone may be too noisy or yield too many matches for performant localization. To augment SAD results, two-way consistency checks may be performed. Two way-consistency may be performed in place of ratio testing to help improve performance. For two-way consistency checking the candidate matching (e.g., for SAD, correlated points with the lowest absolute difference) feature points from the map are identified from on the feature points in the image. Additionally, inverse matching may be performed where the best matching feature points from the image are identified for feature points in the map. If an image feature point is a best match to a map feature point and that map feature point is a best match to that image feature point, then the image feature point may be matched to the map feature point. Matches may be ranked based on how closely the image feature matches with the map feature point and vice versa. The top N matches may be considered candidate matches.

In certain cases, the number of candidate matches may be a relatively large number, such as 50, as compared to the number of matches needed for the perspective n point solution. For example, four matches may be used for a perspective 3 point problem. To reduce the candidate matches down a RANSAC algorithm may be applied. In RANSAC, four candidate points may be randomly selected and used to solve the perspective n point problem, as shown in block 712 and described below, to determine a candidate pose of the camera. The feature points of the 3D map of the remaining N–4 candidate points may then be projected to 2D and matched against the associated 2D feature points of the captured image. An error from these matches may be determined for the estimated camera position. The random candidate point selection, position determination, projection and error determination may be repeated an M number of times and the candidate pose leading to the lowest error is selected as the camera pose.

At block 712, pose estimation may be performed by solving the perspective n point problem for the candidate matches. The perspective n point problem helps determine a pose of a camera given a set of n 3D points in the map and their corresponding 2D matching points in the image. The perspective n point problem takes a set of n 3D points in the map and corresponding 2D matching along with a set of calibrated intrinsic camera parameters to determine a 6 degree of freedom (DOF) pose of the camera in the form of its rotation and translation with respect to the map. The perspective project model for camera can be expressed as $s^*p_c=K[R|T]p_w$, where $p_w=[x\ y\ z\ 1]^T$ is the map point, $p_c=[u\ v\ 1]^T$ is the corresponding image point, K is a matrix of intrinsic camera parameters 714, s is a scale factor for the image point, and R and T are the 3D rotation and 3D translation of the camera (as extrinsic parameters) that are being determined. With respect to the matrix of intrinsic camera parameters, $f_x$ and $f_y$ are scaled focal lengths, $\gamma$ is the skew parameter, and $u_0$, $v_0$ is the principal point. The equation for the perspective n point problem may then be solved by solving for:

$$s\begin{bmatrix}u\\v\\1\end{bmatrix}=\begin{bmatrix}f_x & \gamma & u_0\\0 & f_y & v_0\\0 & 0 & 1\end{bmatrix}\begin{bmatrix}r_{11} & r_{12} & r_{13} & t_1\\r_{21} & r_{22} & r_{23} & t_2\\r_{31} & r_{32} & r_{33} & t_3\end{bmatrix}\begin{bmatrix}x\\y\\z\\1\end{bmatrix}.$$

The camera pose determined from the RANSAC process may be translated to a vehicle location based on the 3D relationship between the camera and the vehicle. It may be understood that reference to the vehicle location can be understood to include the camera location or camera pose. Outlier filtering may be performed at block 716 on the estimated vehicle location. In certain cases, the determined vehicle location may be filtered based on previous or historic motion, either at a relatively constant velocity or with an expected acceleration adjustment. For example, past position estimates along with a time for when the position estimates were taken can provide an expected motion of the vehicle. Based on these past position estimates, an expected position may be determined. This expected position may be compared to the determined vehicle location for consistency. In certain cases, if the locations are within a threshold distance of each other, then the determined vehicle location/6D pose estimate is accepted at block 718. If the locations are not within the threshold distance, then the determined vehicle location may be rejected and the localization process described above may be attempted again, possibly with a new image. In certain cases, if the determined vehicle location translates to motion that is substantially larger than past motion and outside of a maximum permissible motion of the vehicle for a given time period, the vehicle location may also be rejected. In certain cases, the expected position may be used instead of the rejected determined position. The accepted vehicle location may be fed into a Kalman filter along with previous accepted vehicle locations to determine an estimated future 3D location for the vehicle at a later time.

Figure 8:
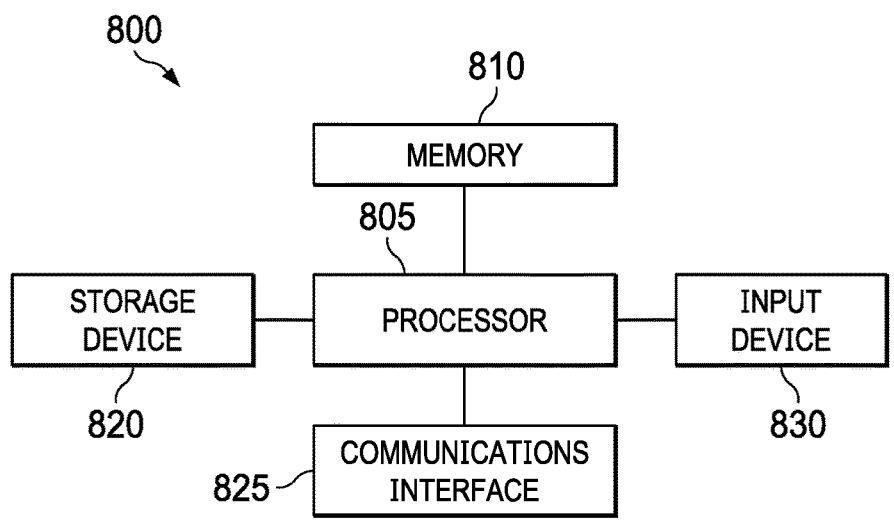
FIG. 8 is a block diagram of an embodiment of a computing device, in accordance with aspects of the present disclosure.

As illustrated in FIG. 8, device 800 includes a processing element such as processor 805 that contains one or more hardware processors, where each hardware processor may have a single or multiple processor cores. Examples of processors include, but are not limited to, a central processing unit (CPU) or a microprocessor. Although not illustrated in FIG. 8, the processing elements that make up processor 805 may also include one or more other types of hardware processing components, such as graphics processing units (GPUs), application specific integrated circuits (ASICs), field-programmable gate arrays (FPGAs), and/or digital signal processors (DSPs). In certain cases, processor 805 may be configured to perform the tasks described in conjunction with FIGS. 2 and 6.

FIG. 8 illustrates that memory 810 may be operatively and communicatively coupled to processor 805. Memory 810 may be a non-transitory computer readable storage medium configured to store various types of data. For example, memory 810 may include one or more volatile devices such as random access memory (RAM). Non-volatile storage devices 820 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 820 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 805. In one embodiment, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800. Storage 820 may be partitioned or split into multiple sections that may be accessed by different software programs. For example, storage 820 may include a section designated for specific purposes, such as storing program instructions or data for updating software of the computing device 800. In one embodiment, the software to be updated includes the ROM, or firmware, of the computing device. In certain cases, the computing device 800 may include multiple operating systems. For example, the computing device 800 may include a general-purpose operating system which is utilized for normal operations. The computing device 800 may also include another operating system, such as a bootloader, for performing specific tasks, such as upgrading and recovering the general-purpose operating system, and allowing access to the computing device 800 at a level generally not available through the general-purpose operating system. Both the general-purpose operating system and another operating system may have access to the section of storage 820 designated for specific purposes.

The one or more communications interfaces may include a radio communications interface for interfacing with one or more radio communications devices. In certain cases, elements coupled to the processor may be included on hardware shared with the processor. For example, the communications interfaces 825, storage, 820, and memory 810 may be included, along with other elements such as the digital radio, in a single chip or package, such as in a system on a chip (SOC). Computing device may also include input and/or output devices, not shown, examples of which include sensors, cameras, human input devices, such as mouse, keyboard, touchscreen, monitors, display screen, tactile or motion generators, speakers, lights, etc. Processed input, for example from the radar device 830, may be output from the computing device 800 via the communications interfaces 825 to one or more other devices.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

While a conventional vehicle with an onboard driver has been described herein, other embodiments may be implemented in vehicle in which the "driver" is remote from the vehicle, such as autonomous vehicles that may be controlled from a remote site.

As use herein, the term "vehicle" may also be applied to other types of devices, such as robots, industrial devices, medical devices, etc. in which low cost, low power processing of images from multiple cameras to form a virtual viewpoint in real time is beneficial.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), a digital signal processor (DSP), etc. The software that executes the techniques may be initially stored in a computer-readable medium such as compact disc (CD), a diskette, a tape, a file, memory, or any other computer readable storage device and then loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A method comprising:
   accessing sensor data associated with an object;
   determining, based on the sensor data, a set of feature points;
   determining an approximate location for the object;
   determining, based on the approximate location and a map header, a subset of a map, wherein the subset of the map specifies a set of map feature points within a volume of area, and wherein the map header specifies, for each map feature point of the set of map feature points, a number of feature descriptors in a set of feature descriptors; and
   comparing the set of feature points to the set of map feature points to determine a pose of the object.

2. The method of claim 1, wherein:
   the set of map feature points is a first set of map feature points;
   the map includes a second set of map feature points that includes the first set of map feature points; and
   the map header specifies a start location of the first set of map feature points within the second set of map feature points.

3. The method of claim 2, wherein the map header further specifies a number of map feature points within the first set of map feature points.

4. The method of claim 1, wherein:
   the determining of the subset of the map and the comparing of the set of feature points to the set of map feature points is performed by a first device;
   the map is stored in a second device; and
   the method further comprises retrieving, by the first device, the subset of the map from the second device.

5. The method of claim 4, wherein the retrieving of the subset of the map is performed over a network.

6. The method of claim 1, wherein the map header specifies a size of the volume of area associated with the subset of the map.

7. The method of claim 1, wherein the map specifies, for each map feature point of the set of map feature points, a location of the respective map feature point in three dimensions.

8. The method of claim 1, wherein the map specifies, for each map feature point of the set of map feature points, the set of feature descriptors.

9. The method of claim 1, wherein the set of feature descriptors includes at least one of a chroma value, a luma value, or a grayscale value.

10. The method of claim 1, wherein:
    the set of sensor data includes an image; and
    the set of feature points includes image feature points of the image.

11. A device comprising:
    one or more processors; and
    a non-transitory memory coupled to the one or more processors and storing instructions, that when executed, cause the one or more processors to:
    receive sensor data that includes a set of feature points;
    determine an approximate location of an object;
    determine, based on the approximate location and a map header, a subset of a map that specifies a set of map feature points, wherein the map specifies, for each map feature point of the set of map feature points, a set of feature descriptors including at least one of a chroma value, a luma value, or a grayscale value; and
    compare the set of feature points to the set of map feature points to determine a pose of the object.

12. The device of claim 11, wherein:
    the set of map feature points is a first set of map feature points;
    the map includes a second set of map feature points that includes the first set of map feature points; and
    the map header specifies a start location of the first set of map feature points within the second set of map feature points.

13. The device of claim 12, wherein the map header further specifies a number of map feature points within the first set of map feature points.

14. The device of claim 11, wherein:
    the device is a first device;
    the map is stored in a second device; and
    the instructions further cause the one or more processors to retrieve the subset of the map from the second device.

15. The device of claim 14, wherein the subset of the map is retrieved from the second device over a network.

16. The device of claim 11, wherein the subset of the map is associated with a volume of area and the map header specifies a size of the volume of area.

17. The device of claim 11, wherein the map specifies, for each map feature point of the set of map feature points, a location of the respective map feature point in three dimensions.

18. A method comprising:
    receiving an image associated with an object;
    determining, based on the image, a set of feature points;
    determining an approximate location for the object;
    determining, based on the approximate location and a map header, a set of map feature points within a volume of area, and wherein the map specifies, for each map feature point of the set of map feature points, a set of feature descriptors including at least one of a chroma value, a luma value, or a grayscale value; and
    determining a pose of the object based on the set of feature points and the set of map feature points.

19. The method of claim 18, wherein the map specifies a size of the volume of area.

* * * * *